United States Patent
Valtolina et al.

(10) Patent No.: US 7,130,605 B2
(45) Date of Patent: Oct. 31, 2006

(54) METHOD AND DEVICE FOR SYNCHRONIZATION AND CANCELLATION OF A PLURALITY ON INTERFERING SIGNALS IN RADIO TRANSMISSION WITH FREQUENCY REUSE

(75) Inventors: Roberto Valtolina, Trezzo sull'Adda (IT); Roberto Pellizzoni, Cantù (IT); Morena Ferrario, Castiglione Olona (IT); Arnaldo Spalvieri, Milan (IT)

(73) Assignee: Alcatel, Paris (FR)

( * ) Notice: Subject to any disclaimer, the term of this patent is extended or adjusted under 35 U.S.C. 154(b) by 517 days.

(21) Appl. No.: 10/372,279

(22) Filed: Feb. 25, 2003

(65) Prior Publication Data

US 2003/0162522 A1    Aug. 28, 2003

(30) Foreign Application Priority Data

Feb. 26, 2002    (IT)    .......................... MI2002A0371

(51) Int. Cl.
*H04B 1/10*    (2006.01)
(52) U.S. Cl. ...................... 455/303; 455/296; 342/361; 375/346
(58) Field of Classification Search ................ 455/313, 455/314, 296, 303, 304, 305; 375/346, 235; 341/361
See application file for complete search history.

(56) References Cited

U.S. PATENT DOCUMENTS

| | | | | | |
|---|---|---|---|---|---|
| 4,577,330 | A | * | 3/1986 | Kavehrad | 375/235 |
| 4,723,321 | A | * | 2/1988 | Saleh | 455/295 |
| 5,327,458 | A | * | 7/1994 | Yamamoto | 375/230 |
| 5,349,609 | A | * | 9/1994 | Tsujimoto | 375/347 |
| 5,442,663 | A | * | 8/1995 | Andersen et al. | 375/229 |
| 5,710,799 | A | * | 1/1998 | Kobayashi | 375/349 |
| 5,818,517 | A | * | 10/1998 | Hudson et al. | 348/21 |
| 6,236,263 | B1 | * | 5/2001 | Iwamatsu | 329/306 |
| 6,731,704 | B1 | * | 5/2004 | Kiyanagi | 375/346 |
| 2003/0078025 | A1 | * | 4/2003 | Smee et al. | 455/307 |
| 2005/0009486 | A1 | * | 1/2005 | Al-Dhahir et al. | 455/213 |

* cited by examiner

*Primary Examiner*—Edward F. Urban
*Assistant Examiner*—Blane J. Jackson
(74) *Attorney, Agent, or Firm*—Sughrue Mion, PLLC

(57) ABSTRACT

A method is provided for realizing, in a radio transmission system, a carrier synchronization and for cancelling one or more co-channel interfering signals from a received main signal, in which a synchronous down-conversion of the received main signal and of each of the interfering signal is performed to obtain respective intermediate frequency signals; and then a synchronous demodulation of the intermediate frequency signals so obtained is carried out.

14 Claims, 6 Drawing Sheets

METHOD AND DEVICE FOR SYNCHRONIZATION AND CANCELLATION OF A PLURALITY ON INTERFERING SIGNALS IN RADIO TRANSMISSION WITH FREQUENCY REUSE

BACKGROUND OF THE INVENTION

The present invention generally pertains to the radio transmission field and, more precisely, point-to-point radio communication system with frequency reuse techniques. Still more in particular, it concerns a method and device for realizing the carrier synchronization when, in addition to the cross-polar signal, one desires to cancel other (one or more) co-channel signals: (whether they are co-polar or cross-polar).

Within the telecommunication systems using microwave radio relay systems of the point-to-point type as a transmitting equipment, there is a constant need to increase as far as possible the spectral efficiency, i.e. the amount of information transmitted per unit of occupied band. An answer to this need is obtained through the frequency reuse: this is a solid technique by now which consists in transmitting simultaneously on the same frequency two different signals on two orthogonal polarizations (for instance on H polarization and on V polarization). Because of the non-ideal nature of the transmitting equipment and medium, the two signals are subjected to mutual interference which can also be of such a level as to make the received signal no longer intelligible.

It is known that through the use of a canceller (hereinafter XPIC) it is possible, at least in principle, to completely eliminate, in reception, the interference of V on H and similarly of H on V (see the basic diagram reproduced in FIG. 1).

Further to the above described problem (increase in the spectral efficiency), in the implementation of telecommunication networks through radio relay systems, one of the biggest problems encountered is concerned with the position of sites, i.e. of the place where to position the (transmit and receive) antennas and the related (transmit and receive) equipment.

Often it happens that, due to orographic, topological needs or yet to needs related to the installation costs, the position of a site cannot be arbitrarily changeable but it is bound; in these circumstances it happens that the site is "crowded" i.e. that several antennas are already present for transmitting and receiving several signals, also isofrequential with the one which it is wished to be transmitted, i.e. co-channel signals.

SUMMARY OF THE INVENTION

In the light of the above considerations, it is the main object of the present invention to provide a method and a device for cancelling several co-channel interfering signals, whether they are co-polar or cross-polar with respect to the desired signal.

It is a further object of the present invention to provide a method and a circuit for carrier syncronization of mutually interfering signals, whether the interference is of cross-polar type or co-polar type.

These and other objects are achieved through a method and a device having the characteristics set forth in claims 1 and 7 respectively. Further advantageous characterstics of the invention are set forth in the respective dependent claims. All of the claims are intended to form an integral part of the present description.

The basic idea of the present invention is to perform a down-conversion from Radio Frequency (RF) to Intermediate Frequency (IF) by means of a single local oscillator and to use a single circuit for the carrier recovery.

BRIEF DESCRIPTION OF THE DRAWINGS

The invention will certainly result in being clear in the light of the following detailed description, merely given by way of non-limiting examples and to be read with reference to the attached drawings wherein.

DETAILED DESCRIPTION OF THE EXEMPLARY EMBODIMENTS

Before entering into a detailed description of the present invention, it is advisable to point out that the cancellation method and device will be described (apart from FIG. 2) in connection with only one polarization (H) for convenience and simplicity of description only. However it is evident that the same identical concepts can be applied to another polarization (V). In other words every single schematic of FIGS. 2 to 6 can be considered as related to a single branch of a receiver for radio transmission with frequency reuse. In theory it would be possible to provide for a receiver in which a receive branch contemplates one schematic of FIGS. 2 to 6 and the other branch contemplates an other schematic of FIGS. 2 to 6.

Figure 1:
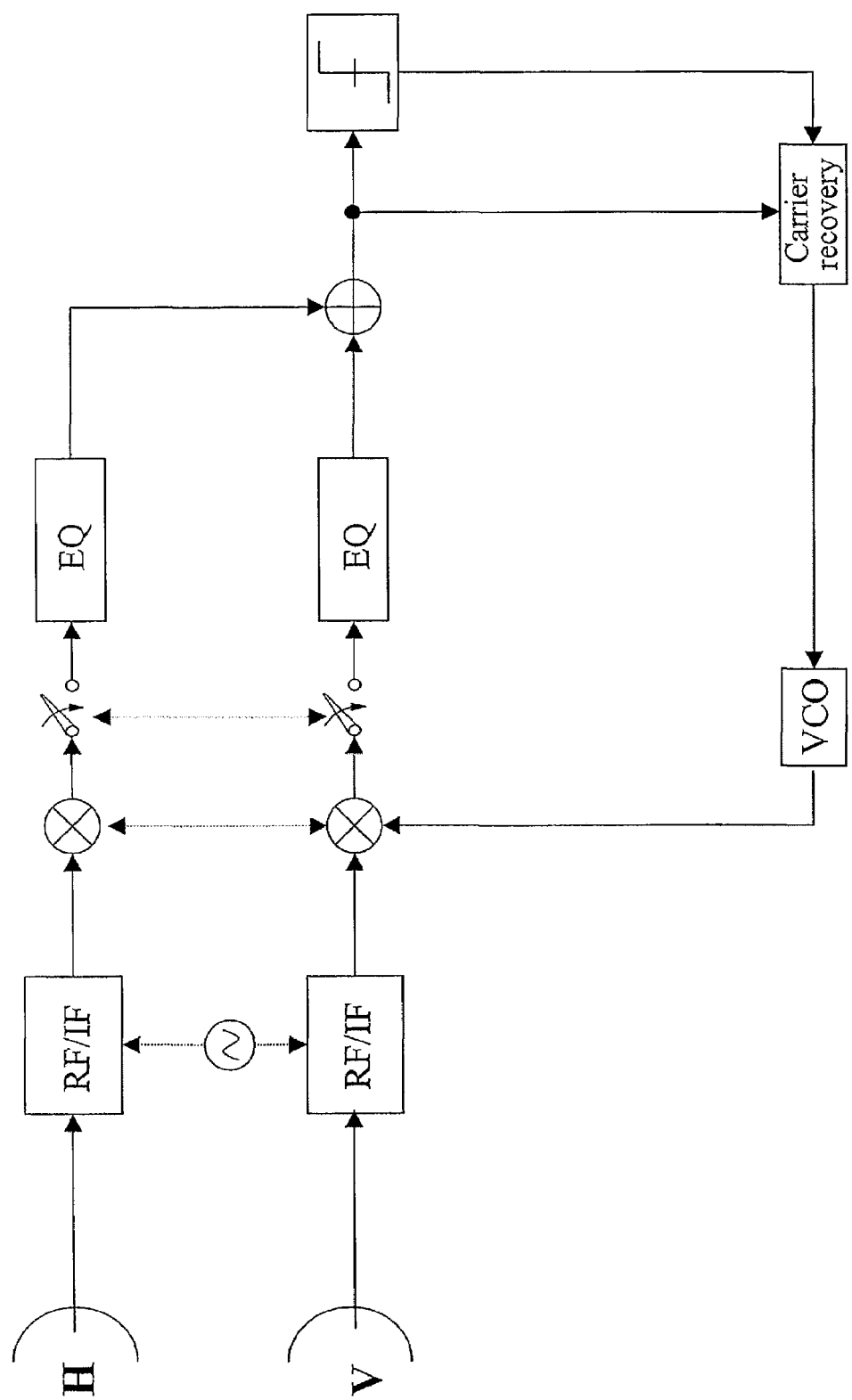
FIG. 1 shows the basic diagram of an XPIC.

FIG. 1 shows a basic diagram of a circuit for cancelling a cross-polar interferer according to the known art. In the schematic of FIG. 1 there is a local oscillator controlling two devices for the down-conversion from Radio Frequency (RF) to Intermediate Frequency (IF), one for each receive branch. The two IF signals are then synchronously demodulated once again by means of a suitable carrier recovery circuit using the signal at the output of a sum node and the decided data, at the output of a threshold decision circuit. Before the sum node there is a sampler and an equalizer for each receive branch.

The schematic of FIG. 1 proves to be efficient in cancelling only one cross-polar interfering signal in the event of cross-polarization transmission. However, it proves to be insufficient for cancelling several interfering signals, for instance caused by the presence of other antennas in the vicinity.

Consider, by way of non-limiting example, the situation of a system with frequency reuse in the presence of another co-channel interfering signal having the same polarization of the main signal. Then let the main signal (the desired one) be transmitted over the H (V) polarization indicated by the symbol H (V), whereas the cross-polar interferer be transmitted over the V polarization and the co-channel be also transmitted over the H (V) polarization.

Then the following situation occurs: the desired signal H will be interfered by an interferer $I_1$ (which in the considered case coincides with the other signal V transmitted over the other polarization) and by an interferer $I_2$ (which in the considered case is an interferer co-polar with the desired signal H).

The desired signal V will be interfered by an interferer $I'_1$ (which in the considered case coincides with the other signal H transmitted over the other polarization) and by an interferer $I'_2$ (which in the considered case is an interferer co-polar with the desired signal V).

Because of the non-ideality of the transmitting medium, it will happen that, in reception, a replica (in case attenuated and/or out of phase and/or distorted) of $I_1$ and $I_2$ which will be called $H_{1H}$ and $I_{2H}$ will be superimposed to the useful signal H. Similarly a replica (in case attenuated and/or out of phase and/or distorted) of H and $I_2$ (which will be called $H_{I1}$ and $I_{2I1}$) will be superimposed to $I_1$ and a replica (in case attenuated and/or out of phase and/or distorted) of H and $I_1$ (which will be called $H_{I2}$ and $I_{1I2}$) will be superimposed to $I_2$.

The solution provided by the present invention for cancelling the interferers $I_{1H}$ and $I_{2H}$ from H consists in performing the down-conversion of the three signals H, $I_1$ and $I_2$ (from the input lines 1,2,3) in a synchronous manner, or by means of a sole local oscillator OL (or by means of several RF local oscillators synchronous with each other). Blocks 15, 16 and 17, driven by the local oscillator OL, just realize the radio frequency stages of the receiver and the conversion of the intermediate frequency IF signal.

The IF signals 4, 5 and 6 are then demodulated (DEM) once more in a synchronous manner by means of suitable carrier recovery circuit using the signal 13 at the output of the sum node SUM and the decided data 14, at the output of a suitable threshold decision circuit DEC. Naturally, before feeding the demodulated signals at the equalizers, they are sampled to obtain the signals 7, 8 and 9. At the output of the sum node SUM after the operations performed by three adaptive equalizers EQ1, EQ2, EQ3, the superimposed interfering signals $I_{1H}$ and $I_{2H}$ have been cancelled from the main signal H obtaining the useful signal H. The same concepts set forth above for H apply to V as well.

The present invention can be applied also when $I_1$ and $I_2$ are generic co-channel interferers.

The updating of the coefficients of the equalizers is performed by means of the minimization (through stochastic gradient method) of a suitable cost function J, which is a function of the signal 13 and in case of the decided data 14. The cost functions suited for the purpose and known in the literature are many. Among these are the CMA (Constant Modulus Algorithm) cost function, the MMSE (Minimum Mean Square Error) function or yet a special cost function described and claimed in the European Patent Application number EP-1,089,457 in the name of the same Applicant.

Note also that the analog-to-digital conversion is performed by synchronizing the analog-to-digital converters each other, the clock recovery being carried out through the conventional Gardner algorithm applied to the sampled signal 7, 8, 9. The circuits and the algorithms just described allow to cancel two interferers from the useful signal and to obtain the related carrier synchronization.

An obvious extension of the basic diagram described above, is the cancellation of N interferers (N being an integer greater than 2), carried out through N equalizers, for instance of an FSE type, and by means of the synchronous down-conversion and a synchronous demodulation.

Figure 2:
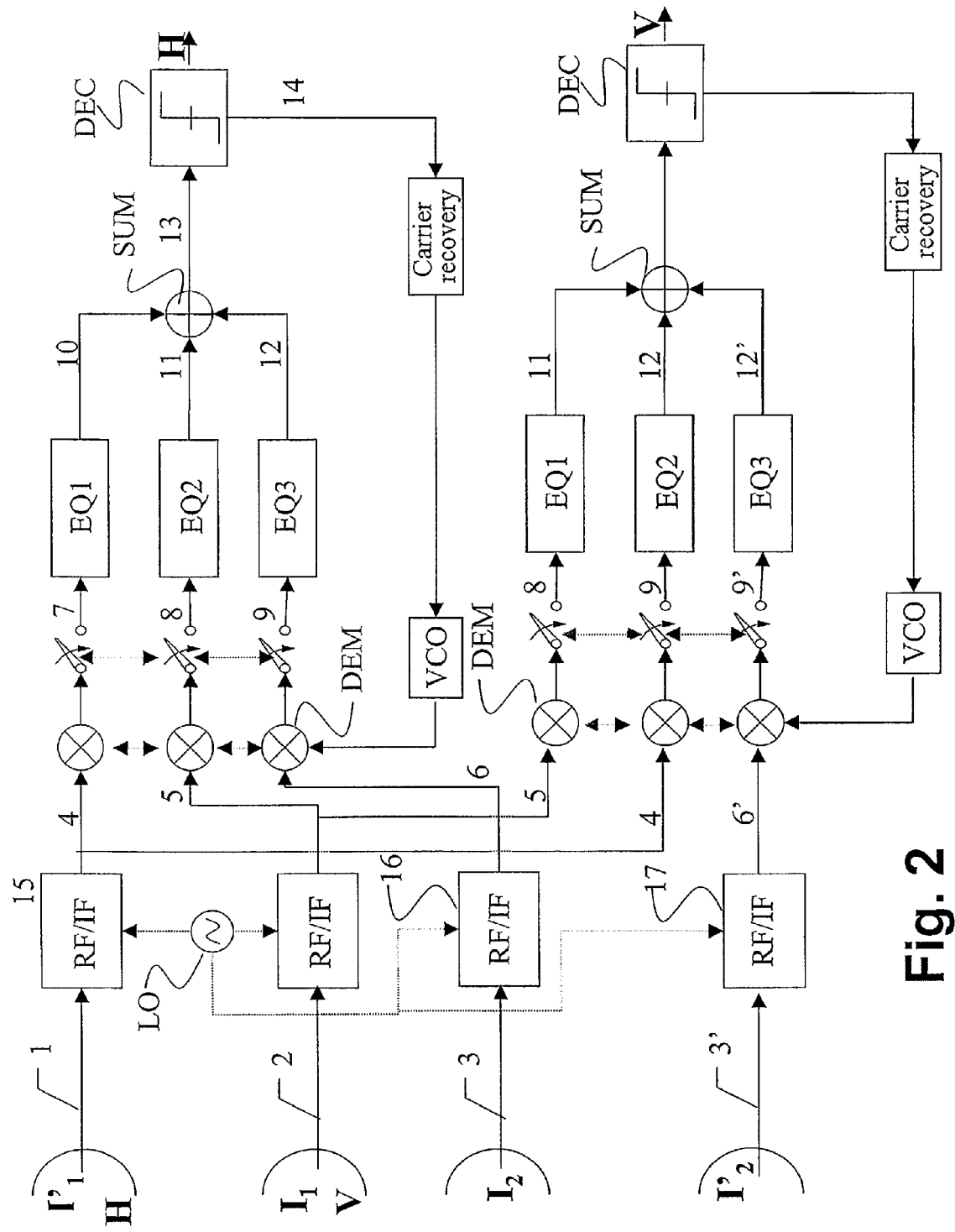
FIG. 2 shows the basic diagram of a complete receiving apparatus devoted to the cancellation, in the case at issue, of two generic co-channel interferers.
Figure 3:
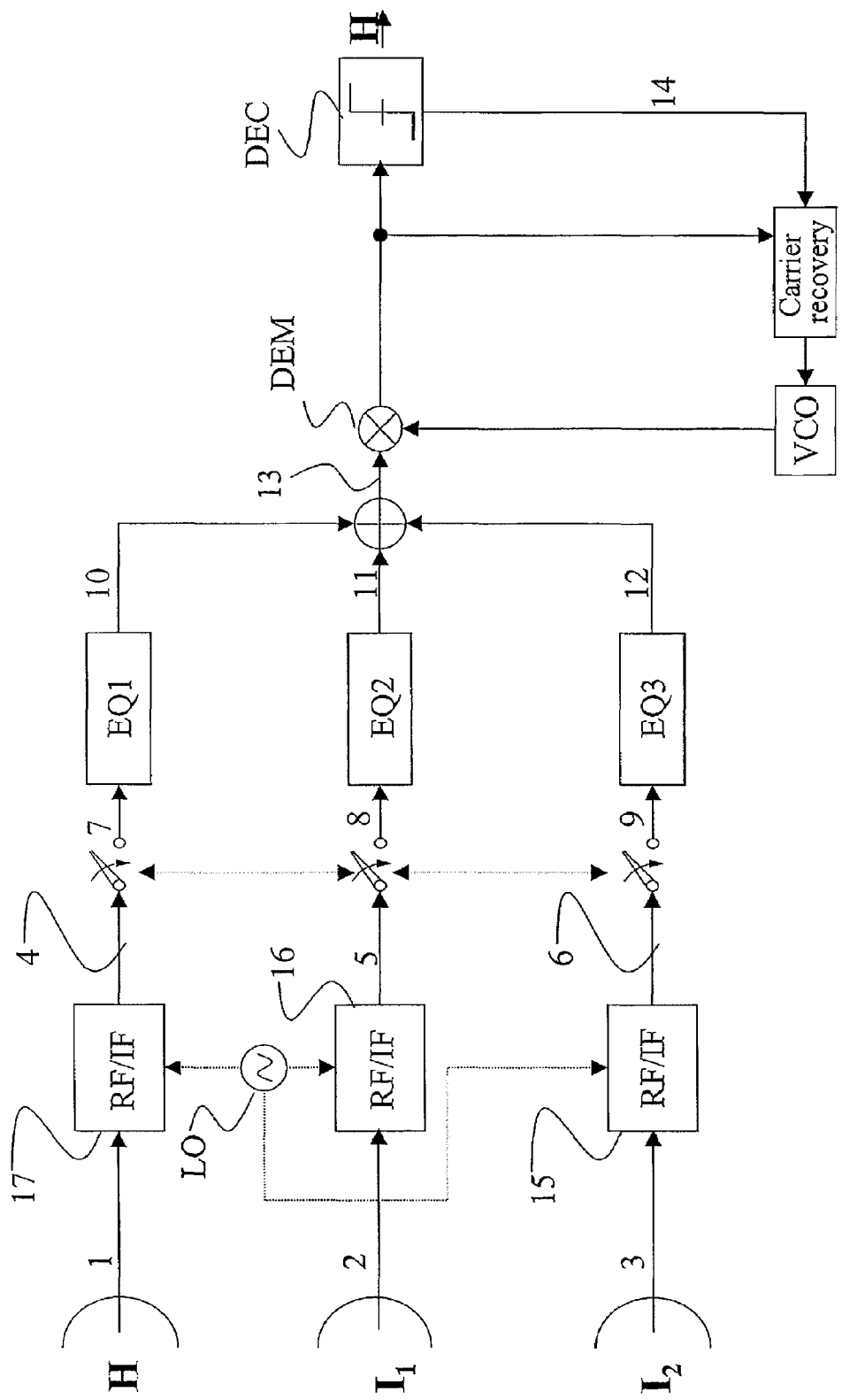
FIG. 3 shows only one receive branch and represents a variant with respect to the basic diagram of FIG. 2, with the demodulation circuits located downstream of the cancellation circuits.

In FIG. 3 there is shown a further embodiment with respect to the schematic of FIG. 2. The sole difference consists in performing the signal demodulation DEM after the sum node SUM.

Figure 4:
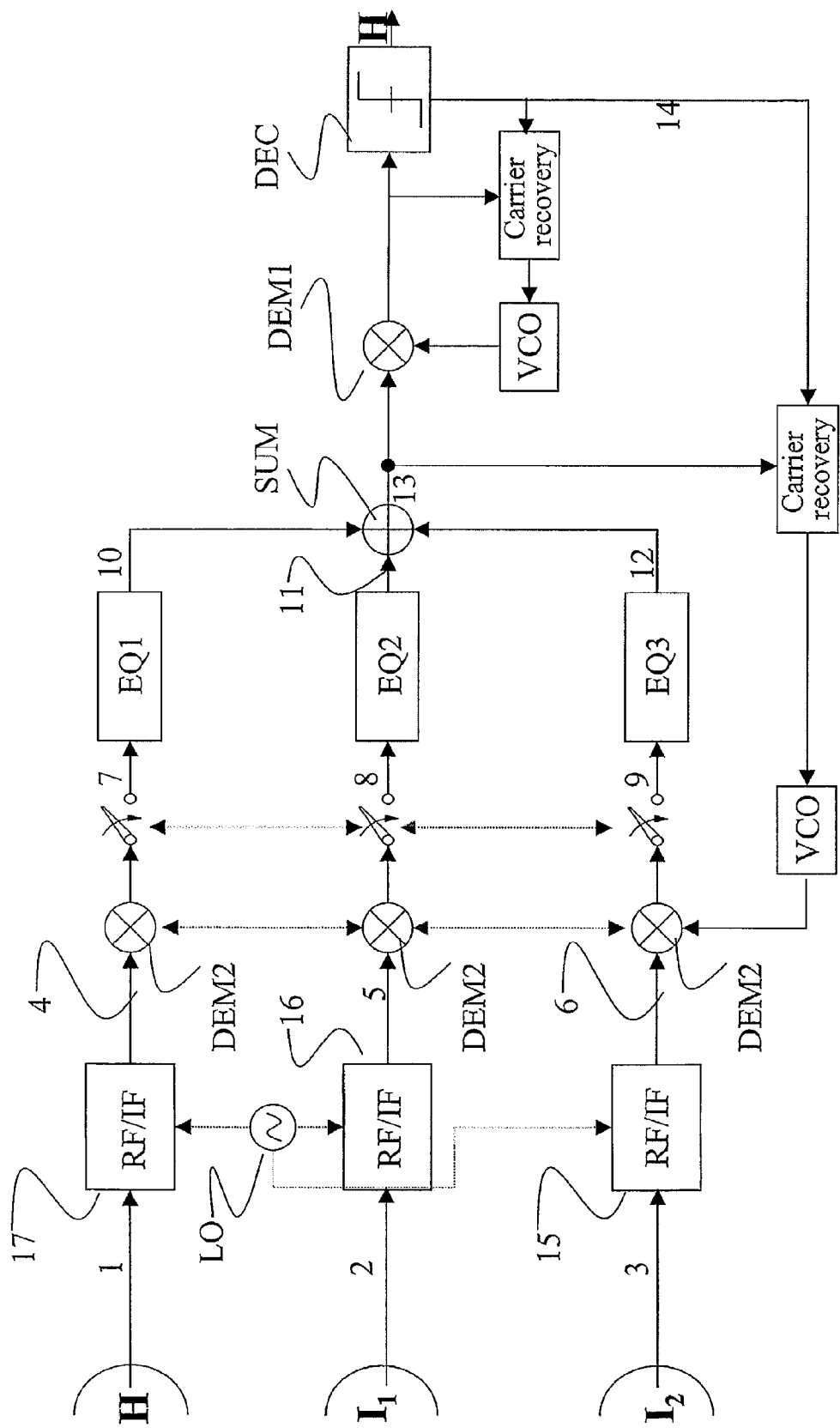
FIG. 4 shows only one receive branch and represents a further variant with respect to the basic diagram of FIG. 2, with the demodulation circuits located both upstream and downstream of the cancellation circuits.

In FIG. 4 there is shown still a further embodiment of the present invention. The difference with respect to the embodiment of FIG. 2 lies in that the demodulation occurs through two different carrier recovery circuits (DEM1, DEM2), respectively located downstream and upstream of the sum node SUM.

Figure 5:
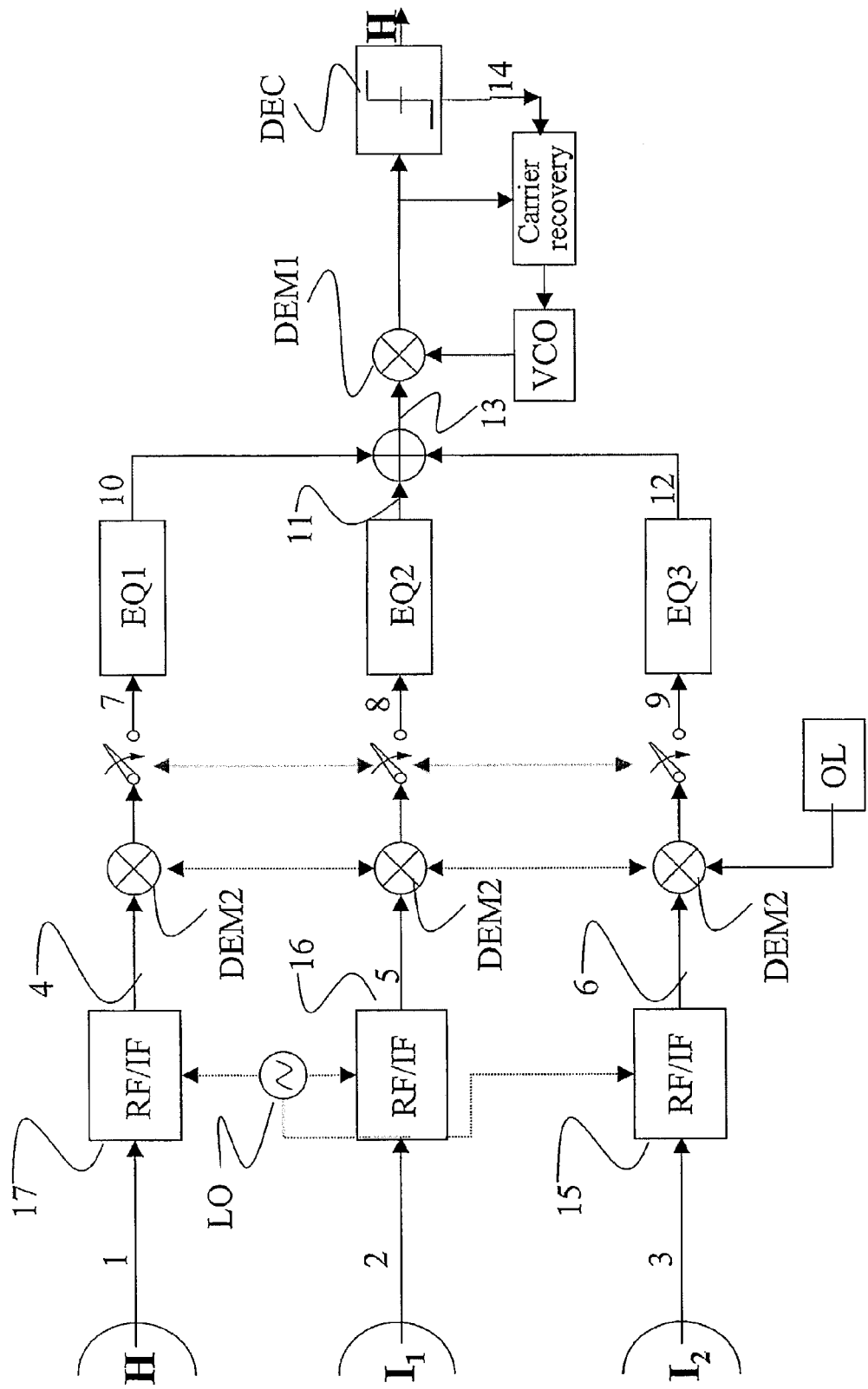
FIG. 5 shows only one receive branch and represents a further variant with respect to the basic diagram of FIG. 2 wherein the signal demodulation is performed upstream of the sum node by means of a free oscillator and downstream thereof by means of a carrier recovery circuit.

In FIG. 5 there is shown a still further embodiment of the present invention. According to this schematic the demodulation of the signal is performed upstream of the sum node SUM through a free oscillator OL and downstream of the sum node utilizing a conventional carrier recovery circuit.

The schematics of FIGS. 3, 4 and 5, as well as the one of FIG. 2, can be applied to the cancellation of any number of interferers even greater than two (still performed through a corresponding number of equalizers, for instance but not necessarily, of the fractionally spaced type, and through the synchronous down-conversion and a synchronous demodulation).

Figure 6:
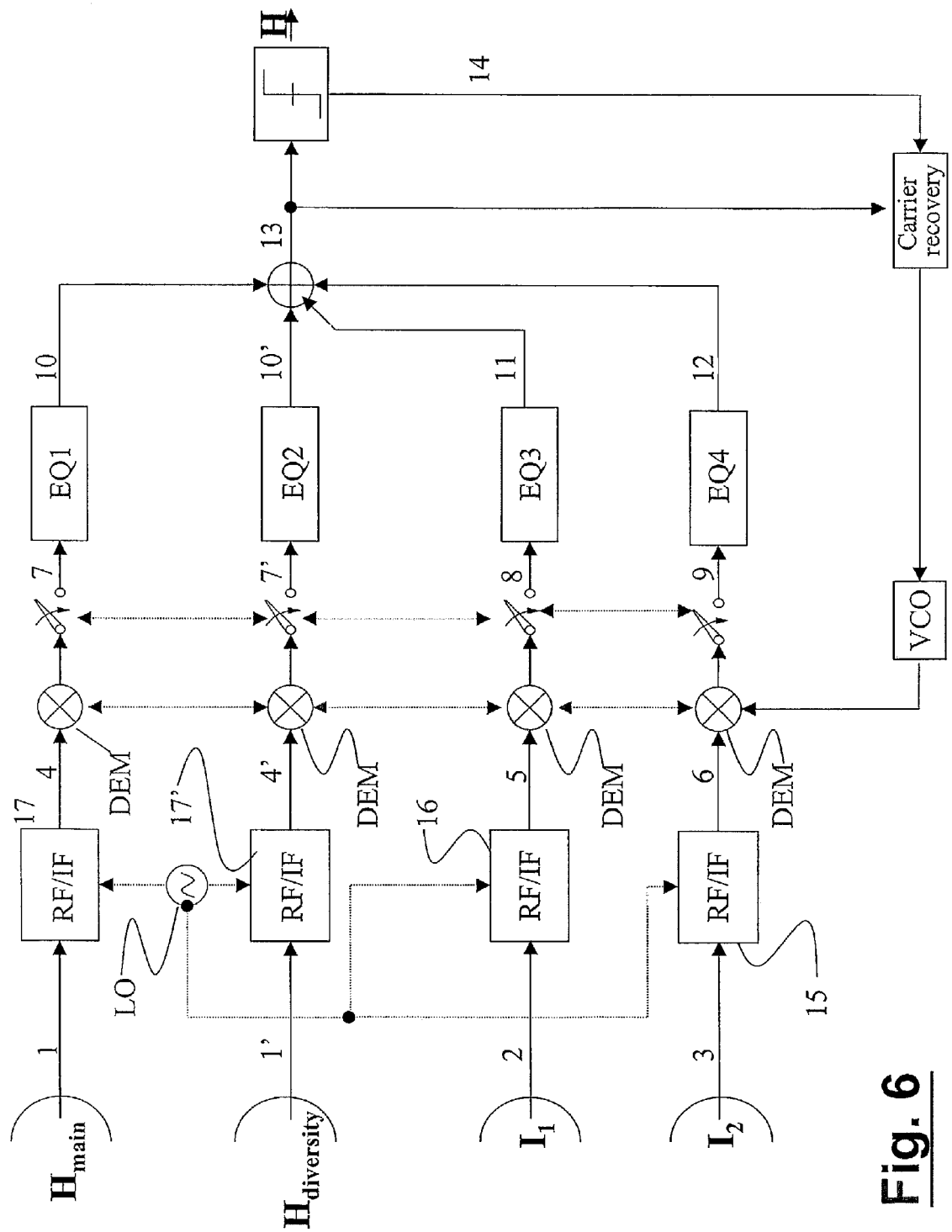
FIG. 6 shows (for a single receive branch) the basic diagram of the space-diversity signal combination along with the cancellation of two co-channel interferers.

In the field of radio transmission, in order to optimize the transmission it is known to use space/angle-diversity systems. The present invention is adapted to be applied to those systems where, besides the cancellation of a number N (N integer greater than 2) of interferers, at the same time it is wished to carry out the baseband combination of M (M being an integer greater than or equal to 2) space-diversity received signals. The schematic of FIG. 6 represents the simplest case where M=2 and N=2; once again it is noticed that both the down-conversion and the demodulation are carried out in a synchronous manner. The wished signal H will be obtained at the output of the decision circuit.

Of course the embodiments of FIGS. 3 to 5 can easily be applied to the schematic of FIG. 6.

A new method and a new device have been described for realizing the carrier synchronization when, besides the cross-polar signal, it is wished to cancel other (one or more) co-channel signals (whether co-polar or cross-polar) that fully satisfy the above objects. Several possible variants, modifications, adaptations and replacements of parts will be apparent to the skilled in the art after reading the present description and related drawings. All these variants, modifications, adaptations and replacements of parts are anyway within the scope of the present invention.

The invention claimed is:

1. A method for realizing, in a radio transmission system, a carrier synchronization and for cancelling a first co-channel interference signal and at least a second co-channel interference signal ($I_1$, $I_2$, $I_3$) from a received main signal (H), the method comprising the steps of:
    performing a synchronous down-conversion of the received main signal (H) and of each of the first co-channel interference signal and the at least one second co-channel interference signal ($I_1$, $I_2$, $I_3$) to obtain respective intermediate frequency signals (4, 5, 6); and
    performing a synchronous demodulation of the intermediate frequency signals (4, 5, 6) so obtained.

2. A method according to claim 1, wherein said received main signal comprises two or more space and/or angle-diversity received signals ($H_{main}$, $H_{diversity}$).

3. A method according to claim 1 or 2, further comprising the steps of:
equalizing the received main signal (H; $H_{main}$, $H_{diversity}$) and the first co-channel interference signal and the at least one second co-channel interference signal ($I_1$, $I_2$, $I_3$) to obtain respective equalized signals; and
summing (SUM) the respective equalized signals to obtain a sum signal (13), wherein the signal synchronous demodulation step is performed upstream of the equalization step by a carrier recovery circuit utilizing the sum signal (13) and a decided data (14) at the output of a decision circuit (DEC).

4. A method according to claim 1 or 2, further comprising the steps of:
equalizing the received main signal (H; $H_{main}$, $H_{diversity}$) and the first co-channel interference signal and the at least one second co-channel interference signal ($I_1$, $I_2$, $I_3$) to obtain respective equalized signals; and
summing (SUM) the respective equalized signals to obtain a sum signal (13), wherein the signal synchronous demodulation step is performed downstream of the equalization step by a carrier recovery circuit utilizing the sum signal (13) and a decided data (14) at the output of a decision circuit (DEC).

5. A method according to claim 1 or 2, further comprising the steps of:
equalizing the received main signal (H; $H_{main}$, $H_{diversity}$) and the first co-channel interference signal and the at least one second co-channel interference signal ($I_1$, $I_2$, $I_3$) to obtain respective equalized signals; and
summing (SUM) the respective equalized signals to obtain a sum signal (13), wherein the signal synchronous demodulation step is performed upstream of the equalization step by a first carrier recovery circuit utilizing the sum signal (13) and a decided data (14) at the output of a decision circuit (DEC) and downstream of the equalization step by a second carrier recovery circuit utilizing the sum signal (13) and a decided data (14) at the output of the decision circuit (DEC).

6. A method according to claim 1 or 2, further comprising the steps of
equalizing the received main signal (H; $H_{main}$, $H_{diversity}$) and the first co-channel interference signal and the at least one second co-channel interference signal ($I_1$, $I_2$, $I_3$) to obtain respective equalized signals; and
summing (SUM) the respective equalized signals to obtain a sum signal (13), wherein the signal synchronous demodulation step is performed downstream of the equalization step by a carrier recovery circuit utilizing the sum signal (13) and a decided data (14) at the output of a decision circuit (DEC) and upstream of the equalization step by means of a free oscillator (OL).

7. A method according to claim 1, wherein the first co-channel interference signal is a cross-polar interference signal and the at least one second interference signal is a co-polar interference signal.

8. A device for realizing, in a radio transmission system, a carrier synchronization and for cancelling a first co-channel interference signal and at least one second co-channel interference signal ($I_1$, $I_2$, $I_3$) from a received main signal (H), the device comprising:
means (LO, RF/IF) for performing a synchronous downconversion of the received main signal (H) and of each of the first co-channel interference signal and the at least one second co-channel interference signal ($I_1$, $I_2$, $I_3$) to obtain respective intermediate frequency signals (4,5,6); and
means for performing a synchronous demodulation of the intermediate frequency signals (4,5,6) so obtained.

9. A device according to claim 8, wherein said received main signal (H) comprises two or more space and/or angle-diversity received signals ($H_{main}$, $H_{diversity}$).

10. A device according to claim 8 or 9, further comprising:
equalizers (EQ1, EQ2, EQ3, EQ4) for equalizing the received main signal (H; $H_{main}$, $H_{diversity}$) and the one or more interfering signals ($I_1$, $I_2$, $I_3$) to obtain respective equalized signals; and
an adder (SUM) for summing the respective equalized signals and obtaining a sum signal (13), wherein the means for performing the signal synchronous demodulation operate upstream of said equalizers and comprise a carrier recovery circuit utilizing the sum signal (13) and a decided data (14), at the output of a decision circuit (DEC).

11. A device according to claim 8 or 9, further comprising:
equalizers (EQ1, EQ2, EQ3, EQ4) for equalizing the received main signal (H; $H_{main}$, $H_{diversity}$) and the first co-channel interference signal and the at least one second co-channel interference signal ($I_1$, $I_2$, $I_3$) to obtain respective equalized signals; and
an adder (SUM) for summing the respective equalized signals and obtaining a sum signal (13), wherein the means for performing the signal synchronous demodulation operate downstream of the equalizers and comprise a carrier recovery circuit utilizing the sum signal (13) and a decided data (14), at the output of a decision circuit (DEC).

12. A device according to claim 8 or 9, further comprising:
equalizers (EQ1, EQ2, EQ3, EQ4) for equalizing the received main signal (H; $H_{main}$, $H_{diversity}$) and the first co-channel interference signal and the at least one second co-channel interference signal ($I_1$, $I_2$, $I_3$) to obtain respective equalized signals; and
an adder (SUM) for summing the respective equalized signals and obtaining a sum signal (13), wherein the means for performing the signal synchronous demodulation operate upstream of the equalizers and comprise a first carrier recovery circuit utilizing the sum signal (13) and a decided data (14), at the output of a decision circuit (DEC) and downstream of the equalizers and comprise a second carrier recovery circuit utilizing the sum signal (13) and a decided data (14), at the output of a decision circuit (DEC).

13. A device according to claim 8 or 9, further comprising:
equalizers (EQ1, EQ2, EQ3, EQ4) for equalizing the received main signal (H; $H_{main}$, $H_{diversity}$) and the first co-channel interference signal and the at least one second co-channel interference signal ($I_1$, $I_2$, $I_3$) to obtain respective equalized signals; and
an adder (SUM) for summing the respective equalized signals and obtaining a sum signal (13), wherein the means for performing the signal synchronous demodulation operate downstream of the equalizers and comprise a second carrier recovery circuit utilizing the sum signal (13) and a decided data (14), at the output of a decision circuit (DEC) and upstream of the equalizers and comprise a free oscillator (OL).

14. A device according to claim 8, wherein the first co-channel interference signal is a cross-polar interference signal and the at least one second interference signal is a co-polar interference signal.

* * * * *